United States Patent
Koga

(10) Patent No.: US 12,491,487 B2
(45) Date of Patent: Dec. 9, 2025

(54) METHOD FOR PRODUCING SILICA MICROCAPSULE

(71) Applicant: KAO CORPORATION, Tokyo (JP)

(72) Inventor: Yoshito Koga, Wakayama (JP)

(73) Assignee: KAO CORPORATION, Tokyo (JP)

( * ) Notice: Subject to any disclaimer, the term of this patent is extended or adjusted under 35 U.S.C. 154(b) by 149 days.

(21) Appl. No.: 18/259,702

(22) PCT Filed: Dec. 28, 2020

(86) PCT No.: PCT/JP2020/049261
§ 371 (c)(1),
(2) Date: Jun. 28, 2023

(87) PCT Pub. No.: WO2022/145018
PCT Pub. Date: Jul. 7, 2022

(65) Prior Publication Data
US 2024/0050913 A1   Feb. 15, 2024

(51) Int. Cl.
| | | |
|---|---|---|
| *B01J 13/02* | (2006.01) | |
| *A61K 8/11* | (2006.01) | |
| *A61K 8/58* | (2006.01) | |
| *A61K 9/50* | (2006.01) | |
| *C11D 17/00* | (2006.01) | |
| *A23L 33/16* | (2016.01) | |
| *A61K 8/25* | (2006.01) | |
| *A61Q 13/00* | (2006.01) | |
| *A61Q 19/00* | (2006.01) | |
| *B01J 13/04* | (2006.01) | |
| *C11D 3/50* | (2006.01) | |

(52) U.S. Cl.
CPC ......... *B01J 13/02* (2013.01); *A61K 8/11* (2013.01); *A61K 8/585* (2013.01); *A61K 9/5089* (2013.01); *C11D 17/0039* (2013.01); *A23L 33/16* (2016.08); *A61K 8/25* (2013.01); *A61K 9/501* (2013.01); *A61K 2800/413* (2013.01); *A61Q 13/00* (2013.01); *A61Q 19/00* (2013.01); *B01J 13/046* (2013.01); *C11D 3/505* (2013.01)

(58) Field of Classification Search
CPC ........................................... B01J 13/02
See application file for complete search history.

(56) References Cited

U.S. PATENT DOCUMENTS

| | | | |
|---|---|---|---|
| 8,110,284 B2* | 2/2012 | Naigertsik | A01N 25/28 424/59 |
| 8,435,559 B2* | 5/2013 | Galeone | A61K 8/893 424/451 |
| 8,974,709 B2 | 3/2015 | Traynor et al. | |
| 9,126,840 B2* | 9/2015 | Yu | C09C 1/30 |
| 9,192,548 B2* | 11/2015 | Traynor | A61K 8/585 |
| 9,346,682 B2* | 5/2016 | Gosselin | A61K 8/25 |
| 9,822,010 B2 | 11/2017 | Traynor et al. | |
| 10,046,291 B2* | 8/2018 | Yamazaki | A61Q 19/00 |
| 10,512,796 B2* | 12/2019 | Toledano | A61K 8/11 |
| 10,653,899 B2 | 5/2020 | Toledano et al. | |
| 11,071,878 B2* | 7/2021 | Toledano | A61K 8/38 |
| 11,179,695 B2* | 11/2021 | Mishiro | C11D 3/001 |
| 11,607,392 B2* | 3/2023 | Gauthier | A01N 65/34 |
| 12,156,946 B2* | 12/2024 | Toledano | A61P 17/08 |
| 2007/0292676 A1 | 12/2007 | Naigertsik et al. | |
| 2008/0199526 A1 | 8/2008 | Poschalko et al. | |
| 2009/0252809 A1 | 10/2009 | Galeone et al. | |
| 2012/0107499 A1 | 5/2012 | Traynor et al. | |
| 2012/0202695 A1 | 8/2012 | Toledano et al. | |
| 2014/0031463 A1 | 1/2014 | Kempter et al. | |
| 2014/0341958 A1 | 11/2014 | Gosselin et al. | |
| 2016/0303531 A1 | 10/2016 | Yamazaki | |
| 2018/0207451 A1 | 7/2018 | Toledano et al. | |
| 2019/0270064 A1* | 9/2019 | Postma | B01J 13/14 |
| 2019/0299186 A1 | 10/2019 | Mishiro et al. | |
| 2023/0050059 A1* | 2/2023 | Sawada | C11D 3/2003 |
| 2023/0107594 A1* | 4/2023 | Yamazaki | B01J 13/185 512/4 |
| 2023/0172195 A1* | 6/2023 | Abu-Reziq | A61K 8/42 424/408 |
| 2024/0050918 A1* | 2/2024 | Koga | A61K 8/342 |
| 2024/0293295 A1* | 9/2024 | Koga | A61Q 13/00 |
| 2024/0325261 A1* | 10/2024 | Koga | A61K 8/44 |
| 2024/0367118 A1* | 11/2024 | Suzuki | B01F 23/4145 |
| 2025/0051696 A1* | 2/2025 | Suzuki | B01J 13/08 |
| 2025/0066693 A1* | 2/2025 | Suzuki | A61K 8/11 |

FOREIGN PATENT DOCUMENTS

| | | |
|---|---|---|
| CN | 102580636 A | 7/2012 |
| CN | 104661741 A | 5/2015 |
| CN | 110036038 A1 | 7/2019 |
| EP | 2 689 836 A1 | 1/2014 |
| JP | 2008-546848 A | 12/2008 |
| JP | 2009-542667 A | 12/2009 |
| JP | 2013-255915 A | 12/2013 |
| JP | 2015-506816 A | 3/2015 |
| JP | 2015-128762 A | 7/2015 |
| JP | 2017-114802 A | 6/2017 |
| WO | WO 2015/083836 A1 | 6/2015 |

OTHER PUBLICATIONS

Extended European Search Report issued Feb. 20, 2025 in European Patent Application No. 20968029.7, 12 pages.
Partial European Search Report issued Oct. 11, 2024 in European Application No. 20968029.7, 15 pgs.
International Search Report issued on Mar. 23, 2021 in PCT/JP2020/049261 (with English translation), 5 pages.

* cited by examiner

*Primary Examiner* — Benjamin A Schiffman
(74) *Attorney, Agent, or Firm* — Oblon, McClelland, Maier & Neustadt, L.L.P.

(57) ABSTRACT

A method for producing a silica microcapsule having a shell containing silica as a constituent component and a core containing one or more organic compounds inside the shell. The method includes subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule.

9 Claims, No Drawings

METHOD FOR PRODUCING SILICA MICROCAPSULE

CROSS REFERENCE TO RELATED APPLICATIONS

This application is a National Stage entry under 35 U.S.C. § 371 of PCT/JP2020/049261, filed on Dec. 28, 2020, incorporated herein by reference.

FIELD OF THE INVENTION

The present invention relates to a method for producing a silica microcapsule and a water dispersion of a silica microcapsule.

BACKGROUND OF THE INVENTION

In a broad range of business fields such as cosmetics, drugs and medicines, general household products, printing, and the like, various microcapsules encapsulating fragrance materials or physiologically active substances therein have been developed and utilized. For example, an aminoplast resin such as a melamine resin or a polyurea/urethane resin has been utilized as a shell constituting the microcapsule. However, microcapsules are inevitably discharged into the environment, and in recent years, they have contributed to a substance of concern called microplastics. Therefore, it is desired to develop microcapsules with high environmental friendliness replacement of aminoplast resin.

Among them, a silica microcapsule (hereinafter, also referred to as a "silica capsule") having a shell containing silica as a constituent component has attracted attention as a material that can be expected to have environmentally friendly.

The silica capsule is generally obtained by a method of forming silica on the surface of an emulsified liquid droplet by a sol-gel method. However, since the silica capsule itself is a very fine particle, the shell of the silica capsule is also very thin and brittle. Therefore, a part of the encapsulated component may be eluted to the external environment by the collapse of the shell and the diffusion of the encapsulated component of the silica capsule through the fine pores present in the shell. Accordingly, various silica capsules using a sol-gel method have heretofore been studied.

For example, JP 2013-255915 A (PTL 1) describes a method for producing a microcapsule having a core material containing an active ingredient such as a sunscreen agent, and the method includes a step of preparing an oil-in-water emulsion by emulsifying an oily phase composed of a water-insoluble precursor and the core material in an aqueous phase composed of an aqueous solution having a predetermined pH, and the aqueous phase used in the step contains a cationic surfactant.

JP 2015-128762 A (PTL 2) aims at obtaining a microcapsule capable of retaining an organic compound as an active ingredient such as a fragrance material therein over a long period of time and describes a method for producing a microcapsule having a core composed of an organic compound such as a fragrance material, a first shell clathrating the core, and a second shell clathrating the first shell, in which a first stage sol-gel reaction is carried out in a state in which an organic phase containing an organic compound and a tetraalkoxysilane is emulsified in an aqueous phase containing a surfactant, and then a second stage sol-gel reaction is carried out in a state in which a pH lower than that of the first stage sol-gel reaction is maintained by adding a tetraalkoxysilane.

SUMMARY OF THE INVENTION

The present invention relates to a method for producing a silica microcapsule having a shell containing silica as a constituent component and a core containing one or more organic compounds inside the shell, the method including a step of subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule.

DETAILED DESCRIPTION OF THE INVENTION

In the techniques of PTLs 1 and 2, it has been found that an intended silica capsule in which leakage of a core component is suppressed cannot be obtained depending on an oil agent to be encapsulated, and an organic compound such as a fragrance material cannot be sufficiently retained at a high encapsulation rate in some cases.

The present invention relates to a method for producing a silica microcapsule in which an organic compound as an active ingredient such as a fragrance material is stably encapsulated at a high encapsulation rate, and a water dispersion containing the silica microcapsule.

The present inventor has found that it is possible to obtain a silica microcapsule in which an organic compound as an active ingredient such as a fragrance material is stably encapsulated at a high encapsulation rate by subjecting an emulsified liquid in which an anion of a sulfate ion, a sulfite ion, or a sulfonate ion is present in the system to a sol-gel reaction.

That is, the present invention relates to the following [1] and [2].

[1] A method for producing a silica microcapsule having a shell containing silica as a constituent component and a core containing one or more organic compounds inside the shell, the method including a step of subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule.

[2] A water dispersion containing a silica microcapsule having a shell containing silica as a constituent component and a core containing one or more organic compounds inside the shell, in which a total content of a sulfate ion, a sulfite ion, and a sulfonate ion is 10 ppm or more and 500 ppm or less.

According to the present invention, it is possible to provide a method for producing a silica microcapsule in which an organic compound as an active ingredient such as a fragrance material is stably encapsulated at a high encapsulation rate, and a water dispersion containing the silica microcapsule.

[Method for Producing Silica Microcapsule]

The method for producing a silica microcapsule (silica capsule) of the present invention is a method for producing a silica capsule having a shell containing silica as a constituent component and a core containing one or more organic compounds inside the shell, the method including a step of subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule (hereinafter, also referred to as "Step I").

In the present invention, the "silica source" means a substance capable of forming a shell of a silica capsule, and examples thereof include a substance that generates a silanol compound by hydrolysis of a tetraalkoxysilane, etc.

In the present invention, the "sol-gel reaction" means a reaction in which the silica source undergoes hydrolysis and polycondensation reaction to form silica, which is a constituent component of the shell, through a sol state and a gel state. As the sol-gel reaction, for example, a reaction in which a tetraalkoxysilane as a silica source is hydrolyzed, a silanol compound generates a siloxane oligomer by a dehydration condensation reaction and a dealcohol condensation reaction, and further a dehydration condensation reaction proceeds so as to form silica is exemplified.

According to the present invention, it is possible to provide a method for producing a silica capsule in which an organic compound as an active ingredient such as a fragrance material is stably encapsulated at a high encapsulation rate, and a water dispersion containing the silica capsule. The reason for this is not clear, but is considered to be as follows.

In the production method of the present invention, since a cationic surfactant is used as an emulsifier for an emulsified liquid to be subjected to a sol-gel reaction, the surface of an emulsified droplet serving as a template for the silica capsule is in a positively charged state. Then, by subjecting the emulsified liquid in which such emulsified droplets are formed, to the sol-gel reaction in the presence of one or more sulfur-containing ions selected from the group consisting of a sulfate ion, a sulfite ion, and a sulfonate ion, the sulfate ion, the sulfite ion, or the sulfonate ion present in the system can take a resonance structure due to the delocalization of electrons between at least two contained oxygen atoms and one contained sulfur atom. Therefore, it is considered that at least two oxygen atoms of these ions are negatively charged, and due to the electrostatic interaction between the at least two negatively charged oxygen atoms and the positively charged nitrogen atoms of the cationic surfactant on the surface of the emulsified droplets serving as a template for the silica capsule, the packing of the cationic surfactant on the surface of the emulsified droplets becomes dense, and in a state where the charge density on the surface of the emulsified droplets is high, the shell formation at the interface of the emulsified droplets is accelerated, and a dense and strong shell is formed. As a result, it is considered that leakage of the core component can be suppressed, and it is possible to provide the silica capsule in which an organic compound is stably encapsulated at a high encapsulation rate.

<Emulsified Liquid>

The emulsified liquid used in the production method of the present invention is obtained by emulsifying an aqueous phase component containing a cationic surfactant and an oil phase component containing one or more organic compounds and a silica source.

[Cationic Surfactant]

The aqueous phase component of the emulsified liquid contains a cationic surfactant.

Examples of the cationic surfactant include an alkylamine salt and an alkyl quaternary ammonium salt. The number of carbon atoms of the alkyl group in the alkylamine salt and the alkyl quaternary ammonium salt is preferably 10 or more, more preferably 12 or more, and still more preferably 14 or more, and is preferably 22 or less, more preferably 20 or less, and still more preferably 18 or less.

Examples of the alkylamine salt include alkylamine acetates such as laurylamine acetate and stearylamine acetate.

Examples of the alkyl quaternary ammonium salt include an alkyltrimethylammonium salt, a dialkyldimethylammonium salt, and an alkylbenzyldimethylammonium salt.

As a counter ion of the cationic group of the cationic surfactant, a halide ion such as a chloride ion or a bromide ion is preferable, and a chloride ion is more preferable.

When the counter ion of the cationic group of the cationic surfactant is a chloride ion, it is considered that an exchange reaction from the chloride ion to a sulfate ion, a sulfite ion, or a sulfonate ion derived from a compound (A) effectively occurs on the surface of the emulsified droplet, packing of the cationic surfactant on the surface of the emulsified droplet becomes dense, the charge density on the surface of the emulsified droplet is increased, shell formation at the interface of the emulsified droplets is accelerated, and a dense and strong shell can be formed. As a result, it is considered that the encapsulation rate of the organic compound can be improved, and a silica capsule in which the organic compound is stably encapsulated can be obtained.

Examples of the alkyltrimethylammonium salt include alkyltrimethylammonium chlorides such as lauryltrimethylammonium chloride, cetyltrimethylammonium chloride, and stearyltrimethylammonium chloride; and alkyltrimethylammonium bromides such as lauryltrimethylammonium bromide, cetyltrimethylammonium bromide, and stearyltrimethylammonium bromide.

Examples of the dialkyldimethylammonium salt include dialkyldimethylammonium chlorides such as distearyldimethylammonium chloride; and dialkyldimethylammonium bromides such as distearyldimethylammonium bromide.

Examples of the alkylbenzyldimethylammonium salt include alkylbenzyldimethylammonium chloride and alkylbenzyldimethylammonium bromide.

The cationic surfactants may be used alone or in combination of two or more thereof.

Among these, the cationic surfactant is preferably a quaternary ammonium salt, more preferably an alkyltrimethylammonium salt having an alkyl group having 10 or more and 22 or less carbon atoms, still more preferably an alkyltrimethylammonium halide having an alkyl group having 10 or more and 22 or less carbon atoms, even more preferably an alkyltrimethylammonium chloride having an alkyl group having 10 or more and 22 or less carbon atoms, yet still more preferably one or more selected from the group consisting of lauryltrimethylammonium chloride, stearyltrimethylammonium chloride, and cetyltrimethylammonium chloride, and yet even more preferably cetyltrimethylammonium chloride.

The amount of the cationic surfactant used in the production method of the present invention is preferably 0.1% by mass or more, more preferably 0.2% by mass or more, and still more preferably 0.3% by mass or more, and is preferably 5% by mass or less, more preferably 3% by mass or less, still more preferably 1% by mass or less, and even more preferably 0.7% by mass or less from the viewpoint of obtaining a stable emulsified liquid and stably encapsulating the organic compound at a high encapsulation rate, with respect to the amount of the organic compound.

Here, the amount of the cationic surfactant is a ratio when the amount of the organic compound is 100% by mass.

The content of the cationic surfactant in the aqueous phase component is preferably less than 0.5% by mass from the viewpoint of obtaining a stable emulsified liquid and efficiently encapsulating the organic compound.

[Organic Compound]

The oil phase component of the emulsified liquid contains one or more organic compounds.

The organic compound is preferably one or more selected from the group consisting of a fragrance material, a fragrance precursor, an oil agent (moisturizer), an antioxidant, an antibacterial agent, a fertilizer, a surface modifier for fibers, skin, hair, and the like, a cold sense agent, a dye, a pigment, silicone, a solvent, and an oil-soluble polymer, more preferably one or more selected from the group consisting of a fragrance material, a fragrance precursor, an oil agent (moisturizer), an antioxidant, an antibacterial agent, a fertilizer, a surface modifier, and a solvent, still more preferably one or more selected from the group consisting of a fragrance material, a fragrance precursor, a moisturizer, an antioxidant, and a solvent, even more preferably one or more selected from a fragrance material, a fragrance precursor, and an oil agent, and yet still more preferably one or more selected from the group consisting of a fragrance material and a fragrance precursor.

The organic compound may be used alone or in combination of two or more thereof.

Examples of the fragrance precursor include a compound that releases a fragrance component by reacting with water, and a compound that releases a fragrance component by reacting with light.

Examples of the compound that releases a fragrance component by reacting with water include a silicic acid ester compound containing an alkoxy component derived from fragrance alcohol, a fatty acid ester compound containing an alkoxy component derived from fragrance alcohol, an acetal compound or a hemiacetal compound obtained through a reaction between a carbonyl component derived from fragrance aldehyde or fragrance ketone and an alcohol compound, a Schiff base compound obtained through a reaction between a carbonyl component derived from fragrance aldehyde or fragrance ketone and a primary amine compound, and a hemiaminal compound or a hydrazone compound obtained through a reaction between a carbonyl component derived from fragrance aldehyde or fragrance ketone and a hydrazine compound.

Examples of the compound that releases a fragrance component by reacting with light include a 2-nitrobenzylether compound containing an alkoxy component derived from fragrance alcohol, an α-keto ester compound containing a carbonyl component derived from fragrance aldehyde or fragrance ketone, and a coumaric acid ester compound containing an alkoxy component derived from fragrance alcohol. These fragrance precursors may be used, for example, as a polymer such as a product of reaction between some carboxy groups of polyacrylic acid and fragrance alcohol.

The organic compound preferably has an appropriate degree of hydrophobicity from the viewpoint of obtaining a stable emulsified liquid and stably encapsulating the organic compound at a high encapsulation rate.

As an index representing the hydrophilicity or hydrophobicity of the organic compound, a cLogP value, which is a calculated value of a common logarithm "LogP" of a partition coefficient P (n-octanol/water) between n-octanol and water, can be used. The cLogP value is "LogP (cLogP)" calculated by the method described in A. Leo Comprehensive Medicinal Chemistry, Vol. 4, C. Hansch, P. G. Sammens, J. B Taylor and C. A. Ramsden, Eds., P. 295, Pergamon Press, 1990, and is a value calculated by the program CLOGP v4.01.

When the organic compound is composed of a plurality of constituent components, the cLogP value of the organic compound can be obtained by multiplying the cLogP value of each constituent component by the volume ratio of each constituent component and calculating the sum of the products.

The cLogP value of the organic compound is preferably 1 or more, more preferably 2 or more, and still more preferably 3 or more, and is preferably 30 or less, more preferably 20 or less, and still more preferably 10 or less.

[Silica Source]

The oil phase component of the emulsified liquid contains a silica source. The silica source preferably contains a tetraalkoxysilane as a main component, is more preferably tetraalkoxysilane having an alkoxy group having 1 or more and 4 or less carbon atoms, still more preferably one or more selected from the group consisting of tetramethoxysilane, tetraethoxysilane, and tetraisopropoxysilane, even more preferably one or more selected from the group consisting of tetramethoxysilane and tetraethoxysilane, and yet still more preferably tetraethoxysilane, from the viewpoint of forming a dense and strong shell and stably encapsulating an organic compound at a high encapsulation rate.

When the silica source contains a tetraalkoxysilane, a trialkoxysilane such as triethoxysilane or trimethoxysilane may be contained, but the content of the tetraalkoxysilane in the silica source is preferably 80% by mass or more, more preferably 85% by mass or more, still more preferably 90% by mass or more, and is preferably 100% by mass or less.

The amount of the silica source used in the production method of the present invention is preferably 10% by mass or more, more preferably 15% by mass or more, and still more preferably 20% by mass or more from the viewpoint of forming a shell capable of surrounding the periphery of the oil-phase emulsified droplet containing the organic compound, and is preferably 100% by mass or less, more preferably 70% by mass or less, still more preferably 50% by mass or less, and even more preferably 30% by mass or less from the viewpoint of suppressing the residue of the silica source inside the oil-phase droplet and efficiently progressing the conversion to the shell, with respect to the amount of the organic compound.

Here, the amount of the silica source is a ratio when the amount of the organic compound is taken as 100% by mass.

The amount of the oil phase component in the total amount of the emulsified liquid is preferably 5% by mass or more, more preferably 10% by mass or more, still more preferably 15% by mass or more, and even more preferably 20% by mass or more from the viewpoint of production efficiency, and is preferably 50% by mass or less, more preferably 45% by mass or less, still more preferably 40% by mass or less, even more preferably 35% by mass or less, and yet still more preferably 30% by mass or less from the viewpoint of obtaining a stable emulsified liquid.

(Preparation of Emulsified Liquid)

In the present invention, the emulsified liquid is preferably prepared by a method including the following Step 1 to Step 3.

Step 1: a step of preparing an aqueous phase component containing a cationic surfactant.

Step 2: a step of mixing one or more organic compounds and a silica source to prepare an oil phase component.

Step 3: a step of mixing and emulsifying the aqueous phase component obtained in Step 1 and the oil phase component obtained in Step 2 to obtain an emulsified liquid From the viewpoint of productivity, the stirring unit used for mixing the organic compound and the silica source in Step 2 is preferably the same as the stirring unit used for mixing and emulsifying the aqueous phase component and the oil phase component in Step 3.

The stirring unit used in Step 2 and Step 3 is not particularly limited, and a homogenizer, a high-pressure dispersion machine, an ultrasonic dispersion machine, or the like having a strong shearing force can be used. Further, a homomixer, "DISPER" (trade name, manufactured by PRIMIX Corporation), "CLEARMIX" (trade name, manufactured by M Technique Co. Ltd.), "Cavitron" (trade name, manufactured by Pacific Machinery & Engineering Co. Ltd.), or the like can also be used.

The median diameter D50 of the emulsified droplets of the emulsified liquid is preferably 0.1 μm or more, more preferably 0.2 μm or more, still more preferably 0.3 μm or more, and even more preferably 0.5 μm or more from the viewpoint of reducing the specific surface area with respect to the environment outside the silica capsule and increasing the encapsulation rate of an organic compound, and is preferably 50 μm or less, more preferably 30 μm or less, still more preferably 10 μm or less, even more preferably 5 μm or less, yet still more preferably 3 μm or less, and yet even more preferably 2 μm or less from the viewpoint of improving the physical strength of the silica capsule and stably encapsulating the organic compound at a high encapsulation rate.

The median diameter D50 can be measured by the method described in Examples.

[Compound (A)]

In the production method of the present invention, the emulsified liquid is subjected to a sol-gel reaction described below in the presence of one or more sulfur-containing ions selected from the group consisting of a sulfate ion, a sulfite ion, and a sulfonate ion.

The sulfur-containing ion is preferably one or more selected from the group consisting of a sulfate ion, a sulfite ion, an aromatic sulfonate ion, and an aliphatic sulfonate ion, more preferably one or more selected from the group consisting of a sulfate ion, a sulfite ion, and a p-toluenesulfonate anion, still more preferably one or more selected from a the group consisting of sulfate ion and a sulfite ion, and even more preferably a sulfate ion, from the viewpoint of forming a dense and strong shell and stably encapsulating an organic compound at a high encapsulation rate.

In Step I, as a method of performing the sol-gel reaction in the presence of one or more sulfur-containing ions selected from the group consisting of a sulfate ion, a sulfite ion, and a sulfonate ion, it is preferable to add one or more compounds (A) selected from the group consisting of sulfuric acid, sulfurous acid, a sulfonic acid compound, and a salt thereof to the emulsified liquid and then perform the sol-gel reaction. As a result, it is considered that an anion of a sulfate ion, a sulfite ion, or a sulfonate ion is present in the system of the emulsified liquid, and the packing of the cationic surfactant on the surface of the emulsified droplets becomes dense, and in a state in which the charge density on the surface of the emulsified droplets is high, shell formation at the interface of the emulsified droplets is accelerated, and a dense and strong shell capable of suppressing leakage of the core component is formed, and as a result, a silica capsule in which an organic compound is stably encapsulated at a high encapsulation rate is obtained.

In the production method of the present invention, anion species other than a sulfate ion, a sulfite ion, and a sulfonate ion may coexist in the system of the emulsified liquid to the extent that the effects of the present invention are not inhibited.

The compound (A) is one or more selected from the group consisting of sulfuric acid, sulfurous acid, a sulfonic acid compound, and a salt thereof.

The sulfonic acid compound is an organic compound having one or more sulfonic acid groups in the molecule, and specific examples thereof include aromatic sulfonic acid compounds such as p-toluenesulfonic acid and benzenesulfonic acid; and aliphatic sulfonic acid compounds such as methanesulfonic acid.

As the salt of the compound (A), an inorganic salt is preferable. Examples thereof include alkali metal salts such as sodium and potassium; and alkaline earth metal salts such as calcium and magnesium.

The compound (A) preferably contains one or more selected from the group consisting of sulfuric acid, sulfurous acid, sulfonic acid compounds, and inorganic salts thereof, more preferably one or more selected from the group consisting of sulfuric acid, sulfurous acid, p-toluenesulfonic acid, and inorganic salts thereof, still more preferably one or more selected from the group consisting of sulfuric acid, sulfurous acid, and inorganic salts thereof, even more preferably one or more selected from the group consisting of sulfuric acid and inorganic salts thereof, yet still more preferably one or more selected from the group consisting of sulfuric acid, sodium sulfate, and magnesium sulfate, yet even more preferably one or more selected from the group consisting of sulfuric acid and sodium sulfate, and further still more preferably sulfuric acid or a salt thereof, from the viewpoint of forming a dense and strong shell and stably encapsulating the organic compound at a high encapsulation rate.

In addition, when the compound (A) is one or more selected from the group consisting of sulfuric acid, sulfurous acid, and sulfonic acid compounds, it is considered that the function as an acid catalyst for the sol-gel reaction can also be exerted, shell formation at the interface of the emulsified droplets is accelerated, a dense and strong shell capable of suppressing leakage of the core component is formed, and a silica capsule in which an organic compound is stably encapsulated at a high encapsulation rate can be obtained.

The compound (A) may be used alone or in combination of two or more thereof.

The amount of the compound (A) used in the production method of the present invention is preferably 0.01 or more, more preferably 0.03 or more, and still more preferably 0.05 or more, and is preferably 2 or less, more preferably 1.5 or less, still more preferably 1.0 or less, even more preferably 0.7 or less, yet still more preferably 0.5 or less, yet even more preferably 0.3 or less, further still more preferably 0.2 or less, further even more preferably 0.1 or less, and still further preferably 0.07 or less, as a molar ratio [(sulfur-containing ions)/(counter ions of cationic groups)] of the total molar amount of the sulfur-containing ions to the molar amount of the counter ions of the cationic groups of the cationic surfactant, from the viewpoint of forming a dense and strong shell and stably encapsulating the organic compound at a high encapsulation rate.

In addition, in the calculation of the above-described molar ratio [(sulfur-containing ions)/(counter ions of cationic groups)], when two or more kinds of sulfur-containing ions are present, the molar amount of the sulfur-containing ions is the total molar amount thereof, and when two or more kinds of counter ions of cationic groups are present, the molar amount of the counter ions of cationic groups is the total molar amount thereof.

Further, when the compound (A) has a function as an acid catalyst, the amount of the compound (A) used in the production method of the present invention is preferably added so as to be within the initial pH range of the sol-gel reaction described later from the viewpoint of forming a dense and strong shell and stably encapsulating the organic compound at a high encapsulation rate.

In the present invention, the molar ratio of the total molar amount of the sulfur-containing ions to the molar amount of the halide ions in the system [(sulfur-containing ions)/(halide ions)] is preferably 0.01 or more, more preferably 0.02 or more, and still more preferably 0.03 or more, and is preferably 0.3 or less, more preferably 0.15 or less, still more preferably 0.1 or less, and even more preferably 0.07 or less, from the viewpoint of forming a dense and strong shell and stably encapsulating the organic compound at a high encapsulation rate.

Examples of the halide ion include a chloride ion, a bromide ion, and an iodide ion.

In addition, in the calculation of the above-described molar ratio [(sulfur-containing ions)/(halide ions)], when two or more kinds of sulfur-containing ions are present, the molar amount of the sulfur-containing ions is the total molar amount thereof, and when two or more kinds of halide ions are present, the molar amount of the halide ions is the total molar amount thereof.

(Sol-Gel Reaction)

In the present invention, the emulsified liquid is subjected to a sol-gel reaction in the presence of one or more sulfur-containing ions selected from the group consisting of a sulfate ion, a sulfite ion, and a sulfonate ion to form a silica capsule having a shell containing silica as a constituent component and a core containing the organic compound inside the shell, thereby obtaining a water dispersion containing the silica capsule.

The sol-gel reaction is preferably carried out under an acidic condition.

The initial pH of the sol-gel reaction is preferably 3.0 or more, more preferably 3.3 or more, and still more preferably 3.5 or more from the viewpoint of maintaining the balance between the hydrolysis reaction and the condensation reaction of the shell source and from the viewpoint of suppressing the formation of a highly hydrophilic sol and promoting the progress of encapsulation, and is preferably 4.5 or less, more preferably 4.3 or less, and still more preferably 4.1 or less from the viewpoint of suppressing the formation of a shell accompanied with the aggregation of emulsified droplets and obtaining a silica capsule having a dense and strong shell.

In order to adjust the initial pH of the sol-gel reaction to a desired range, it is preferable to add an arbitrary acidic or alkaline pH adjuster to the emulsified liquid according to the pH of the emulsified liquid depending on the strength of acidity or alkalinity of the oil phase component containing the organic compound.

When the pH of the emulsified liquid becomes a desired value or less, it is preferable to adjust the pH using an alkaline pH adjuster.

When the pH of the emulsified liquid becomes a desired value or more, it is preferable to adjust the pH using an acidic pH adjuster.

The above-mentioned compound (A) can be added as a pH adjuster, but an acidic pH adjuster may be used in addition to the compound (A). Examples of the acidic pH adjuster include inorganic acids such as hydrochloric acid and nitric acid; organic acids such as citric acid; and liquids obtained by adding a cation exchange resin or the like to water, ethanol, or the like.

Examples of the alkaline pH adjuster include alkali metal hydroxides such as sodium hydroxide and potassium hydroxide; alkali metal hydrogencarbonates such as sodium hydrogencarbonate; ammonia; ammonium hydroxide; and organic amines such as diethanolamine, triethanolamine, and trishydroxymethylaminomethane. Among these, one or more selected from the group consisting of sodium hydroxide and ammonium hydroxide are preferable.

As the pH adjuster, one kind may be used alone, or two or more kinds may be used.

In the present invention, the compound (A) is preferably used as an acidic pH adjuster from the viewpoint of ease of production. In this case, the compound (A) is more preferably one or more selected from the group consisting of sulfuric acid, sulfurous acid, and p-toluenesulfonic acid, still more preferably one or more selected from the group consisting of sulfuric acid and sulfurous acid, and even more preferably sulfuric acid.

In addition, in the present invention, even when an inorganic salt such as hydrochloric acid or nitric acid, an organic acid such as citric acid, or the like other than the compound (A) is used as the acidic pH adjuster, suitable sol-gel reaction conditions similar to those when a compound having a function as a pH adjuster such as sulfuric acid is used as the compound (A) can be obtained by adding a sodium sulfate salt, a magnesium sulfate salt, or the like as the compound (A).

The reaction temperature of the sol-gel reaction can be selected to any value as long as it is the melting point or higher and the boiling point or lower of the water contained as the dispersion medium, but it is preferable to adjust the reaction temperature to preferably 5° C. or higher, more preferably 10° C. or higher, and still more preferably 15° C. or higher, and is preferably 60° C. or lower, more preferably 50° C. or lower, and still more preferably 40° C. or lower, from the viewpoint of controlling the balance between the hydrolysis reaction and the condensation reaction in the sol-gel reaction, forming a dense and strong shell, and stably encapsulating the organic compound at a high encapsulation rate.

In the present invention, the silica capsules obtained by the above-described Step I are obtained as a water dispersion containing silica capsules dispersed in water. The silica capsules obtained by this Step I are silica capsules having a shell of a single-shell structure.

In the present invention, the method may further include a step (hereinafter also referred to as "Step II") of further adding a silica source to the water dispersion containing the silica capsules obtained in Step I and performing a sol-gel reaction to form silica capsules having a shell that further clathrate the silica capsules. By Step II, a shell is further formed on the silica capsule having a single-shell structure formed in Step I, and it is also considered that the silica capsule obtained in Step II becomes a silica capsule having a single-shell structure in which the thickness of the shell is increased, and it is also considered that the silica capsule becomes a silica capsule having a shell having a double-shell structure in which the shell formed in Step I is an inner shell and the shell formed in Step II is an outer shell.

The temperature of the sol-gel reaction in Step II may be the same as that in Step I.

The amount of the silica source in Step II is preferably 3% by mass or more, more preferably 5% by mass or more, and still more preferably 10% by mass or more with respect to the amount of the organic compound, and from the viewpoint of suppressing the residue of the silica source inside the oil-phase droplets and efficiently progressing the conversion to the shell, it is preferably 50% by mass or less, more preferably 30% by mass or less, and still more preferably 20% by mass or less.

In the production method of the present invention, from the viewpoint of reducing the number of production steps and efficiently producing a silica capsule in which an organic compound is stably encapsulated at a high encapsulation rate, it is preferable to form the silica capsule only in Step I.

In addition, in the production method of the present invention, from the viewpoint of improving the physical strength of the silica capsule and stably encapsulating the organic compound at a high encapsulation rate, it is preferable to form the silica capsule by performing Step I and Step II.

[Water Dispersion Containing Silica Microcapsules]

The silica microcapsules (silica capsules) according to the present invention have a shell containing silica as a constituent component and a core containing one or more organic compounds inside the shell, and are obtained as a water dispersion containing silica capsules in which the silica microcapsules are dispersed in water.

In the present invention, depending on the use of the silica capsules, the silica capsules can be used as they are as a water dispersion, but the silica capsules may be separated from the water dispersion and used according to the use of the silica capsules. As the separation method, a filtration method, a centrifugation method, or the like can be employed.

The total content of a sulfate ion, a sulfite ion, and a sulfonate ion (total content of sulfur-containing ions) in the water dispersion containing the silica microcapsules according to the present invention is preferably 10 ppm or more, more preferably 13 ppm or more, and still more preferably 15 ppm or more, and is preferably 500 ppm or less, more preferably 450 ppm or less, still more preferably 400 ppm or less, even more preferably 200 ppm or less, yet still more preferably 100 ppm or less, yet even more preferably 70 ppm or less, further still more preferably 50 ppm or less, and further even more preferably 30 ppm or less, from the viewpoint of stably encapsulating the organic compound at a high encapsulation rate.

The total content of the sulfur-containing ions in the water dispersion of the silica microcapsules can be measured by quantifying each component by ion chromatography. It can also be calculated from the blending amount of each component.

The average thickness of the shell of the silica capsule according to the present invention is preferably 5 nm or more, and more preferably 10 nm or more, and is preferably 100 nm or less, more preferably 70 nm or less, still more preferably 50 nm or less, even more preferably 30 nm or less, and yet still more preferably 20 nm or less, from the viewpoint of stably encapsulating the organic compound at a high encapsulation rate.

The average thickness of the shell can be measured by transmission electron microscope (TEM) observation. Specifically, the thickness of the shell is actually measured on the photograph under the transmission electron microscope observation. This operation is performed while changing the field of view. From the obtained data, the distribution of the average thickness of the shell is obtained. The standard magnification of the transmission electron microscope is 10,000 times or more and 100,000 times or less, and is appropriately adjusted depending on the size of the silica capsule. Here, as the transmission electron microscope (TEM), for example, a trade name "JEM-2100" (manufactured by JEOL Ltd.) can be used.

The median diameter D50 of the silica capsule according to the present invention is preferably 0.1 μm or more, more preferably 0.5 μm or more, and still more preferably 1 μm or more from the viewpoint of improving the dispersion stability of the silica capsule and stably encapsulating the organic compound at a high encapsulation rate, and is preferably 50 μm or less, more preferably 30 μm or less, still more preferably 10 μm or less, even more preferably 5 μm or less, and yet still more preferably 3 μm or less from the viewpoint of improving the physical strength of the silica capsule and stably encapsulating the organic compound at a high encapsulation rate.

The median diameter D50 of the silica capsule can be measured by the method described in the Examples.

The silica capsule according to the present invention and the water dispersion containing the silica capsule can be used for various applications, and for example, can be suitably used in various applications such as cosmetics such as a milky lotion, a cosmetic liquid, a cosmetic water, a beauty serum, a cream, a gel formulation, a hair treatment agent, and quasi-drugs, fiber treatment agents such as a detergent, a softener, and an anti-wrinkle spray, sanitary products such as paper diapers, and air fresheners.

Regarding the above-mentioned embodiments, the present invention further discloses the following method for producing silica microcapsules and a water dispersion containing silica microcapsules.

<1> A method for producing a silica microcapsule having a shell containing silica as a constituent component and a core containing one or more organic compounds inside the shell, the method including a step of subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule.

<2> The method for producing a silica microcapsule as set forth in <1>, in which the sulfur-containing ion is preferably one or more selected from the group consisting of a sulfate ion, a sulfite ion, an aromatic sulfonate ion, and an aliphatic sulfonate ion, more preferably one or more selected from the group consisting of a sulfate ion, a sulfite ion, and a p-toluenesulfonate anion, still more preferably one or more selected from the group consisting of a sulfate ion and a sulfite ion, and even more preferably a sulfate ion.

<3> The method for producing a silica microcapsule as set forth in <1> or <2>, in which in the step of forming a silica microcapsule, one or more compounds (A) selected from the group consisting of sulfuric acid, sulfurous acid, a sulfonic acid compound, and a salt thereof are added to the emulsified liquid, and then the emulsified liquid is subjected to a sol-gel reaction.

<4> The method for producing a silica microcapsule as set forth in <3>, in which the compound (A) preferably contains one or more selected from the group consisting of sulfuric acid, sulfurous acid, sulfonic acid compounds, and inorganic salts thereof, more preferably one or more selected from the group consisting of sulfuric acid, sulfurous acid, p-toluenesulfonic acid, and inorganic salts thereof, still more preferably one or more selected from the group consisting of sulfuric acid, sulfurous acid, and inorganic salts thereof, even more preferably one or more selected from the group consisting of sulfuric acid and inorganic salts thereof, yet still more preferably one or more selected from the group consisting of sulfuric acid, sodium sulfate, and magnesium sulfate, yet even more preferably one or more selected from the group consisting of sulfuric acid and sodium sulfate, and further still more preferably sulfuric acid or a salt thereof.

<5> The method for producing a silica microcapsule as set forth in <3> or <4>, in which the amount of the compound (A) is preferably 0.01 or more, more preferably 0.03 or more, and still more preferably 0.05 or more, and is preferably 2 or less, more preferably 1.5 or less, still more preferably 1.0 or less, even more preferably 0.7 or less, yet still more preferably 0.5 or less, yet even more preferably 0.3 or less, further still more preferably 0.2 or less, further even more preferably 0.1 or less, and still further preferably 0.07 or less, as a molar ratio [(sulfur-containing ions)/(counter ions of cationic groups)] of the total molar amount of the sulfur-containing ions to the molar amount of the counter ions of the cationic groups of the cationic surfactant.

<6> The method for producing a silica microcapsule as set forth in any of <1> to <5>, in which the molar ratio of the total molar amount of the sulfur-containing ions to the molar amount of the halide ions in the system [(sulfur-containing ions)/(halide ions)] is preferably 0.01 or more, more preferably 0.02 or more, and still more preferably 0.03 or more, and is preferably 0.3 or less, more preferably 0.15 or less, still more preferably 0.1 or less, and even more preferably 0.07 or less, from the viewpoint of forming a dense and strong shell and stably encapsulating the organic compound at a high encapsulation rate.

<7> The method for producing a silica microcapsule as set forth in any of <1> to <6>, in which n the silica source contains a tetraalkoxysilane as a main component.

<8> The method for producing a silica microcapsule as set forth in any of <7>, in which the content of tetraalkoxysilane in the silica source is preferably 80% by mass or more, more preferably 85% by mass or more, and still more preferably 90% by mass or more, and is preferably 100% by mass or less.

<9> The method for producing a silica microcapsule as set forth in any of <1> to <8>, in which the amount of the silica source is preferably 10% by mass or more, more preferably 15% by mass or more, and still more preferably 20% by mass or more, and is preferably 100% by mass or less, more preferably 70% by mass or less, still more preferably 50% by mass or less, and even more preferably 30% by mass or less, with respect to the amount of the organic compound.

<10> The method for producing a silica microcapsule as set forth in any of <1> to <9>, in which the cationic surfactant is preferably a quaternary ammonium salt, more preferably an alkyltrimethylammonium salt having an alkyl group having 10 or more and 22 or less carbon atoms, still more preferably an alkyltrimethylammonium halide having an alkyl group having 10 or more and 22 or less carbon atoms, even more preferably an alkyltrimethylammonium chloride having an alkyl group having 10 or more and 22 or less carbon atoms, yet still more preferably one or more selected from the group consisting of lauryltrimethylammonium chloride, stearyltrimethylammonium chloride, and cetyltrimethylammonium chloride, and yet even more preferably cetyltrimethylammonium chloride.

<11> The method for producing a silica microcapsule as set forth in any of <1> to <10>, in which the amount of the cationic surfactant is preferably 0.1% by mass or more, more preferably 0.2% by mass or more, and still more preferably 0.3% by mass or more, and is preferably 5% by mass or less, more preferably 3% by mass or less, still more preferably 1% by mass or less, and even more preferably 0.7% by mass or less, with respect to the amount of the organic compound.

<12> The method for producing a silica microcapsule as set forth in any of <1> to <11>, in which a median diameter D50 of emulsified droplets of the emulsified liquid is preferably 0.1 μm or more, more preferably 0.2 μm or more, still more preferably 0.3 μm or more, and even more preferably 0.5 μm or more, and is preferably 50 μm or less, more preferably 30 μm or less, still more preferably 10 μm or less, even more preferably 5 μm or less, yet still more preferably 3 μm or less, and yet even more preferably 2 μm or less.

<13> The method for producing a silica microcapsule as set forth in any of <1> to <12>, in which a stirring unit used for emulsifying the aqueous phase component and the oil-phase component is a homogenizer, a high-pressure dispersing machine, or an ultrasonic dispersing machine.

<14> The method for producing a silica microcapsule as set forth in any of <1> to <13>, in which an initial pH of the sol-gel reaction is preferably 3.0 or more, more preferably 3.3 or more, and still more preferably 3.5 or more, and is preferably 4.5 or less, more preferably 4.3 or less, and still more preferably 4.1 or less.

<15> The method for producing a silica microcapsule as set forth in any of <1> to <14>, in which the reaction temperature of the sol-gel reaction is preferably 5° C. or higher, more preferably 10° C. or higher, and still more preferably 15° C. or higher, and is preferably 60° C. or lower, more preferably 50° C. or lower, and still more preferably 40° C. or lower.

<16> The method for producing a silica microcapsule as set forth in any of <1> to <15>, in which a cLogP value of the organic compound is preferably 1 or more, more preferably 2 or more, and still more preferably 3 or more, and is preferably 30 or less, more preferably 20 or less, and still more preferably 10 or less.

<17> The method for producing a silica microcapsule as set forth in any of <1> to <16>, in which the organic compound is preferably one or more selected from the group consisting of a fragrance material, a fragrance precursor, an oil agent (moisturizer), an antioxidant, an antibacterial agent, a fertilizer, a surface modifier for fibers, skin, hair, and the like, a cold sense agent, a dye, a pigment, silicone, a solvent, and an oil-soluble polymer, more preferably one or more selected from the group consisting of a fragrance material, a fragrance precursor, an oil agent (moisturizer), an antioxidant, an antibacterial agent, a fertilizer, a surface modifier, and a solvent, still more preferably one or more selected from the group consisting of a fragrance material, a fragrance precursor, a moisturizer, an antioxidant, and a solvent, even more preferably one or more selected from the group consisting of a fragrance material, a fragrance precursor, and an oil agent, and yet still more preferably one or more selected from the group consisting of a fragrance material and a fragrance precursor.

<18> The method for producing a silica microcapsule as set forth in any of <1> to <17>, in which a median diameter D50 of the silica microcapsule is preferably 0.1 μm or more, more preferably 0.5 μm or more, and still more preferably 1 μm or more, and is preferably 50 μm or less, more preferably 30 μm or less, still more preferably 10 μm or less, even more preferably 5 μm or less, and yet still more preferably 3 μm or less.

<19> A method for producing a silica microcapsule having a shell containing silica as a constituent component and a core containing one or more organic compounds inside the shell, the method including a step of subjecting an emulsified liquid obtained by emulsifying an aqueous phase component containing a quaternary ammonium salt as a cationic surfactant and an oil phase component containing one or more organic compounds and a silica source containing a tetraalkoxysilane as a main component to a sol-gel reaction in the presence of one or more sulfur-containing ions selected from the group consisting of a sulfate ion, a sulfite ion, and a sulfonate ion to form the silica microcapsule, in which the organic compound is one or more selected from the group consisting of a fragrance material and a fragrance precursor.

<20> The method for producing a silica microcapsule as set forth in <19>, in which in the step of forming a silica microcapsule, one or more compounds (A) selected from the group consisting of sulfuric acid, sulfurous acid, a sulfonic acid compound, and a salt thereof are added to the emulsified liquid, and then the emulsified liquid is subjected to a sol-gel reaction.

<21> The method for producing a silica microcapsule as set forth in <20>, in which the amount of the compound (A) is preferably 0.01 or more, more preferably 0.03 or more, and still more preferably 0.05 or more, and is preferably 2 or less, more preferably 1.5 or less, still more preferably 1.0 or less, even more preferably 0.7 or less, yet still more preferably 0.5 or less, yet even more preferably 0.3 or less, further still more preferably 0.2 or less, further even more preferably 0.1 or less, and still further preferably 0.07 or less, as a molar ratio [(sulfur-containing ions)/(counter ions of cationic groups)] of the total molar amount of the sulfur-containing ions to the molar amount of the counter ions of the cationic groups of the cationic surfactant.

<22> The method for producing a silica microcapsule as set forth in any of <19> to <21>, in which a cLogP value of the organic compound is preferably 1 or more, more preferably 2 or more, and still more preferably 3 or more, and is preferably 30 or less, more preferably 20 or less, and still more preferably 10 or less.

<23> The method for producing a silica microcapsule as set forth in any of <19> to <22>, in which a median diameter D50 of emulsified droplets of the emulsified liquid is preferably 0.1 μm or more, more preferably 0.2 μm or more, still more preferably 0.3 μm or more, and even more preferably 0.5 μm or more, and is preferably 50 μm or less, more preferably 30 μm or less, still more preferably 10 μm or less, even more preferably 5 μm or less, yet still more preferably 3 μm or less, and yet even more preferably 2 μm or less.

<24> The method for producing a silica microcapsule as set forth in any of <19> to <23>, in which an initial pH of the sol-gel reaction is preferably 3.0 or more, more preferably 3.3 or more, and still more preferably 3.5 or more, and is preferably 4.5 or less, more preferably 4.3 or less, and still more preferably 4.1 or less.

<25> A water dispersion containing silica microcapsules having a shell containing silica as a constituent component and a core containing one or more organic compounds inside the shell, in which the total content of a sulfate ion, a sulfite ion, and a sulfonate ion (total content of sulfur-containing ions) in the water dispersion containing the silica microcapsules is preferably 10 ppm or more, more preferably 13 ppm or more, and still more preferably 15 ppm or more, and is preferably 500 ppm or less, more preferably 450 ppm or less, still more preferably 400 ppm or less, even more preferably 200 ppm or less, yet still more preferably 100 ppm or less, yet even more preferably 70 ppm or less, further still more preferably 50 ppm or less, further even more preferably 30 ppm or less, and 10 ppm or more and 500 ppm or less.

EXAMPLES

Various measurements used in Examples and Comparative Examples were performed by the following methods.

[Median Diameter $D_{50}$]

The median diameter D50 of emulsified droplets and the median diameter D50 of silica capsules were measured by using a laser diffraction/scattering particle size distribution measuring apparatus "LA-960" (trade name, manufactured by HORIBA, Ltd.). For the measurement, a flow cell was used, the medium was water, and the index of refraction was set to 1.45-0i. An emulsified liquid or a water dispersion containing silica capsules was added to the flow cell, and the measurement was carried out at a concentration at which a transmittance of around 90% is exhibited so as to obtain the median diameter D50 on a volume basis.

<Model Fragrance Material A>

As the organic compound contained in the silica capsule, a model fragrance material A (volume-average cLogP value: 4.3) having the composition shown in Table 1 was used. The volume average cLogP value of the model fragrance material was calculated as the sum of the cLogP values of all the components of the fragrance components contained in the model fragrance material, each multiplied by the volume ratio in the model fragrance material.

TABLE 1

| | Model fragrance material A | |
|---|---|---|
| Fragrance component name | Content (% by mass) | cLogP |
| Linalool | 22 | 3.3 |
| Linalyl acetate | 16 | 4.4 |
| Tetrahydrolinalool | 16 | 3.6 |
| Others | 46 | |

Example 1

Step I 0.30 g of QUARTAMIN 60W (trade name, manufactured by Kao Corporation; cetyltrimethylammonium chloride (indicated as "CTAC" in Table 2 below), active ingredient 30% by mass) was diluted with 74.70 g of ion-exchanged water to prepare an aqueous phase component. To this aqueous phase component, an oil phase component prepared by mixing 20 g of the model fragrance material A and 5 g of tetraethoxysilane (hereinafter referred to as "TEOS") was added, and the mixed solution was emulsified using a homomixer (model: HM-310, manufactured by HsiangTai Machinery Industry Co., Ltd.) set at a rotation speed of 7,000 rpm to obtain an emulsified liquid (1). The median diameter $D_{50}$ of the emulsified droplets at this time was 1.1 µm.

Next, 0.16 g of a 1% by mass sulfuric acid aqueous solution was added to the obtained emulsified liquid (1) to obtain an emulsified liquid (1') whose pH was adjusted to 3.8, and then the emulsified liquid (1') was transferred to a separable flask equipped with a stirring blade and stirred at 200 rpm for 24 hours while maintaining the liquid temperature at 30° C., thereby obtaining a water dispersion (I) containing silica capsules each having a core composed of the model fragrance material A and a shell composed of silica. The median diameter $D_{50}$ of the obtained silica capsules was 2.1 µm.

Example 2

Step I

An emulsified liquid (1) was obtained in the same manner as in Example 1.

Next, 0.29 g of a 1% by mass sulfurous acid aqueous solution was added to the obtained emulsified liquid (1) to obtain an emulsified liquid (2') whose pH was adjusted to 3.8, and then the emulsified liquid (2') was transferred to a separable flask equipped with a stirring blade and stirred at 200 rpm for 24 hours while maintaining the liquid temperature at 30° C., thereby obtaining a water dispersion (II) containing silica capsules each having a core composed of the model fragrance material A and a shell composed of silica. The median diameter $D_{50}$ of the silica capsules was 2.2 µm.

Example 3

Step I

An emulsified liquid (1) was obtained in the same manner as in Example 1.

Next, 0.41 g of a 1% by mass p-toluenesulfonic acid aqueous solution was added to the obtained emulsified liquid (1) to obtain an emulsified liquid (3') whose pH was adjusted to 3.7, and then the emulsified liquid (3') was transferred to a separable flask equipped with a stirring blade and stirred at 200 rpm for 24 hours while maintaining the liquid temperature at 30° C., thereby obtaining a water dispersion (III) containing silica capsules each having a core composed of the model fragrance material A and a shell composed of silica. The median diameter $D_{50}$ of the silica capsules was 2.1 µm.

Example 4

Step I

An emulsified liquid (1) was obtained in the same manner as in Example 1.

Next, 0.29 g of a 1% by mass sodium sulfate aqueous solution was added to the obtained emulsified liquid (1), and then 0.1N hydrochloric acid aqueous solution was added to adjust the pH to 3.8 to obtain an emulsified liquid (4'), and then the emulsified liquid (4') was transferred to a separable flask equipped with a stirring blade and stirred at 200 rpm for 24 hours while maintaining the liquid temperature at 30° C., thereby obtaining a water dispersion (IV) containing silica capsules each having a core composed of the model fragrance material A and a shell composed of silica. The median diameter $D_{50}$ of the silica capsules was 2.2 µm.

Example 5

Step I 100.16 g of the water dispersion (I) containing silica capsules was obtained in the same manner as in Example 1.

Step II

Next, 0.40 g of TEOS was additionally added to 13.00 g of the water dispersion (I) over 10 seconds, and then the mixture was stirred for 24 hours while maintaining the liquid temperature at 30° C., and was cooled to room temperature to form a second shell that clathrates the silica capsule, thereby obtaining a water dispersion (V) containing silica capsules in which the model fragrance material A was encapsulated in amorphous silica. The median diameter $D_{50}$ of the silica capsules was 2.1 µm.

Example 6

Step I 100.29 g of the water dispersion (IV) containing silica capsules was obtained in the same manner as in Example 4.

Step II

Next, 0.39 g of TEOS was additionally added to 13.00 g of the water dispersion (IV) over 10 seconds, and then the mixture was stirred for 24 hours while maintaining the liquid temperature at 30° C., and was cooled to room temperature to form a second shell that clathrates the silica capsule, thereby obtaining a water dispersion (VI) containing silica capsules in which the model fragrance material A was encapsulated in amorphous silica. The median diameter $D_{50}$ of the silica capsules was 2.2 μm.

Comparative Example 1

Step I'

An emulsified liquid (1) was obtained in the same manner as in Example 1.

Next, a 0.1N hydrochloric acid aqueous solution was added to the obtained emulsified liquid (1) to obtain an emulsified liquid (C1') whose pH was adjusted to 3.8, and then the emulsified liquid (C1') was transferred to a separable flask equipped with a stirring blade and stirred at 200 rpm for 24 hours while maintaining the liquid temperature at 30° C., thereby obtaining a water dispersion (CI) containing silica capsules each having a core composed of the model fragrance material A and a shell composed of silica. The median diameter $D_{50}$ of the silica capsules was 2.1 μm.

Comparative Example 2

Step I'

An emulsified liquid (1) was obtained in the same manner as in Example 1.

Next, a 1% by mass nitric acid aqueous solution was added to the obtained emulsified liquid (1) to obtain an emulsified liquid (C2') whose pH was adjusted to 3.8, and then the emulsified liquid (C2') was transferred to a separable flask equipped with a stirring blade and stirred at 200 rpm for 24 hours while maintaining the liquid temperature at 30° C., thereby obtaining a water dispersion (CII) containing silica capsules each having a core composed of the model fragrance material A and a shell composed of silica. The median diameter $D_{50}$ of the silica capsules was 2.2 μm.

Comparative Example 3

Step I'

An emulsified liquid (1) was obtained in the same manner as in Example 1.

Next, a 10% by mass citric acid aqueous solution was added to the obtained emulsified liquid (1) to obtain an emulsified liquid (C3') whose pH was adjusted to 3.8, and then the emulsified liquid (C3') was transferred to a separable flask equipped with a stirring blade and stirred at 200 rpm for 24 hours while maintaining the liquid temperature at 30° C., thereby obtaining a water dispersion (CIII) containing silica capsules each having a core composed of the model fragrance material A and a shell composed of silica. The median diameter $D_{50}$ of the silica capsules was 2.1 μm.

[Evaluation of Silica Capsules]

(Evaluation of Encapsulation Rate of Fragrance Component)

Each 30 mg of the water dispersions containing the silica capsules obtained in Examples 1 to 6 and Comparative Examples 1 to 3 was scooped with a dropper, diluted with 50 g of ion-exchanged water, and then passed through a membrane filter (manufactured by Merck Millipore Corporation, product name "Omnipore", model number "JAWP04700") to recover the silica capsules on the membrane filter.

Further, the silica capsule was washed on the membrane filter with 10 mL of ion-exchanged water and then 10 mL of hexane, and then the silica capsule was immersed in 10 mL of acetonitrile containing dodecane as an internal standard at a concentration of 20 μg/mL, and ultrasonic waves were irradiated for 60 minutes under conditions of an output of 180 W and an oscillation frequency of 42 kHz using an ultrasonic irradiation apparatus (manufactured by Branson, model "5510") to elute the fragrance material in the silica capsule. This solution was again passed through a membrane filter (manufactured by TOYO ROSHI KAISHA, Ltd., product name "DISMIC", model "13JP020AN"), and then each of the fragrance components contained in the solution was measured using gas chromatography, and the amount α of each fragrance component encapsulated in the silica capsule was obtained. Next, the encapsulation rate of the fragrance component was calculated according to the following equation. The results are shown in Table 2 below.

Encapsulation rate (%) of fragrance component={(amount α of each fragrance component encapsulated in silica capsule)/(amount β of each fragrance component contained in water dispersion 30 mg of silica capsule)}×100

In addition, the amount β of the fragrance component in the above equation was calculated from the composition of the model fragrance material used and the content in the water dispersion containing the silica capsule.

TABLE 2

| | Step I | | | | | | |
|---|---|---|---|---|---|---|---|
| | Emulsified liquid | | | | | | |
| | Aqueous phase component | | Oil phase component | | Median | Compound (A) | |
| | Cationic surfactant type | Addition amount of cationic surfactant (% by mass)*1 | Organic compound type | Addition amount of silica source (TEOS) (% by mass)*1 | diameter D50 of emulsified droplet (μm) | Type | Addition amount Molar ratio [(sulfur-containing ion)/(counter ion of cationic group of cationic surfactant)] |
| Ex. 1 | CTAC | 0.45 | Model fragrance A | 25 | 1.1 | Sulfuric acid | 0.059 |
| Ex. 2 | CTAC | 0.45 | Model fragrance A | 25 | 1.1 | Sulfurous acid | 0.129 |
| Ex. 3 | CTAC | 0.45 | Model fragrance A | 25 | 1.1 | p-toluene sulfonic acid | 0.085 |
| Ex. 4 | CTAC | 0.45 | Model fragrance A | 25 | 1.1 | Sodium sulfate | 0.070 |
| Ex. 5 | CTAC | 0.45 | Model fragrance A | 25 | 1.1 | Sulfuric acid | 0.059 |

TABLE 2-continued

| | | | | | | | |
|---|---|---|---|---|---|---|---|
| Ex. 6 | CTAC | 0.45 | Model fragrance A | 25 | 1.1 | Sodium sulfate | 0.070 |
| Comp. Ex. 1 | CTAC | 0.45 | Model fragrance A | 25 | 1.1 | — | — |
| Comp. Ex. 2 | CTAC | 0.45 | Model fragrance A | 25 | 1.1 | — | — |
| Comp. Ex. 3 | CTAC | 0.45 | Model fragrance A | 25 | 1.1 | — | — |

| | Step I | | | Step II | Water dispersion containing silica capsule Total | Evaluation Encapsulation rate (%) of fragrance component contained in model fragrance material A | |
|---|---|---|---|---|---|---|---|
| | Compound (A') Type | Molar ratio [(sulfur-containing ion)/ (halide ion)] | Initial pH of sol-gel reaction | Additional addition of silica source (TEOS) | content of sulfur-containing ion (ppm)*2 | Total of linalool and tetrahydro-linalool | Linalyl acetate |
| Ex. 1 | — | 0.059 | 3.8 | No | 16 | 97 | 100 |
| Ex. 2 | — | 0.129 | 3.8 | No | 29 | 93 | 94 |
| Ex. 3 | — | 0.085 | 3.7 | No | 41 | 74 | 86 |
| Ex. 4 | Hydrochloric acid | 0.062 | 3.8 | No | 19 | 98 | 97 |
| Ex. 5 | — | 0.059 | 3.8 | Yes | 15 | 87 | 98 |
| Ex. 6 | Hydrochloric acid | 0.062 | 3.8 | Yes | 19 | 93 | 96 |
| Comp. Ex. 1 | Hydrochloric acid | — | 3.8 | No | — | 36 | 63 |
| Comp. Ex. 2 | Nitric acid | — | 3.8 | No | — | 28 | 60 |
| Comp. Ex. 3 | Citric accid | — | 3.8 | No | — | 15 | 53 |

*1: Addition amount with respect to organic compound (% by mass)
*2: Calculated value from the blending amount of each component (ppm)

It can be seen from Table 2 that the silica capsules obtained in Examples have a higher encapsulation rate of the fragrance component than that of Comparative Examples. In addition, it can be seen that the silica capsules obtained in Examples maintain a high encapsulation rate and can enable a stable encapsulation even though the silica capsules are subjected to suction filtration in the evaluation of the encapsulation rate.

INDUSTRIAL APPLICABILITY

According to the present invention, since it is possible to obtain a silica capsule in which an organic compound which is an active ingredient of a fragrance material or the like is stably encapsulated at a high encapsulation rate, the silica capsule and a water dispersion containing the silica capsule can be suitably used for various products in which an active ingredient such as a fragrance material is blended.

The invention claimed is:

1. A method for producing a silica microcapsule having a shell containing silica as a constituent component and a core containing one or more organic compounds inside the shell, the method comprising:
   subjecting an emulsified liquid obtained by emulsifying an aqueous phase component containing a cationic surfactant and an oil phase component containing one or more organic compounds and a silica source to a sol-gel reaction in the presence of one or more sulfur-containing ions selected from the group consisting of a sulfate ion, a sulfite ion, and a sulfonate ion to form the silica microcapsule, and
   a molar ratio of the total molar amount of the sulfur-containing ions to the molar amount of the counter ions of the cationic groups of the cationic surfactant [(sulfur-containing ions)/(counter ions of cationic groups)] is 0.01 or more and 2 or less.

2. The method for producing a silica microcapsule according to claim 1, wherein one or more compounds (A) selected from the group consisting of sulfuric acid, sulfurous acid, a sulfonic acid compound, and a salt thereof are added to the emulsified liquid, and then the emulsified liquid is subjected to the sol-gel reaction.

3. The method for producing a silica microcapsule according to claim 2, wherein the compound (A) is one or more selected from the group consisting of sulfuric acid, sulfurous acid, a sulfonic acid compound, and an inorganic salt thereof.

4. The method for producing a silica microcapsule according to claim 1, wherein an amount of the silica source is 10% by mass or more and 100% by mass or less with respect to an amount of the organic compound.

5. The method for producing a silica microcapsule according to claim 1, wherein the cationic surfactant is an alkyltrimethylammonium salt having an alkyl group having 10 or more and 22 or less carbon atoms.

6. The method for producing a silica microcapsule according to claim 1, wherein a median diameter D50 of emulsified droplets of the emulsified liquid is 0.1 μm or more and 10 μm or less.

7. The method for producing a silica microcapsule according to claim 1, wherein an initial pH of the sol-gel reaction is 3.0 or more and 4.5 or less.

8. The method for producing a silica microcapsule according to claim 1, wherein the one or more organic compounds is selected from the group consisting of a fragrance material, a fragrance precursor, a moisturizer, an antioxidant, an antibacterial agent, a fertilizer, a surface modifier, and a solvent.

9. The method for producing a silica microcapsule according to claim 1, wherein the silica source comprises a tetraalkoxysilane as a main component.

* * * * *